Figure 1:
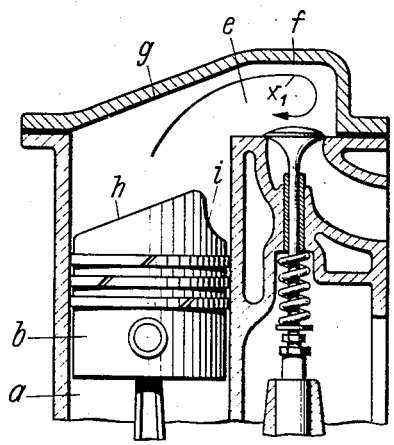

Aug. 17, 1954     F. K. H. NALLINGER     2,686,513
INTERNAL-COMBUSTION ENGINE WITH SIDE COMPRESSION CHAMBER
Filed June 6, 1950

Inventor
Friedrich K. H. Nallinger
By
Dickie and Padlon
attorneys

Patented Aug. 17, 1954

2,686,513

UNITED STATES PATENT OFFICE 2,686,513

INTERNAL-COMBUSTION ENGINE WITH SIDE COMPRESSION CHAMBER

Friedrich K. H. Nallinger, Stuttgart, Germany, assignor to Daimler-Benz Aktiengesellschaft, Stuttgart-Unterturkheim, Germany Application June 6, 1950, Serial No. 166,359

Claims priority, application Germany June 7, 1949

3 Claims. (Cl. 123—191)

This invention pertains to an internal combustion engine which is provided with a compression chamber arranged in the cylinder head at one side thereof, so as to project out of the circumferential surface of the cylinder, and serving particularly as a valve chamber.

One object of this invention consists in that the side compression chamber and the passage sections between the cylinder space and the compression space are shaped in such a way that the air displaced and compressed is caused to whirl as freely and uniformly as possible during the whole travel of the piston.

Another object of the invention consists in that the passage sections are so designed as to permit of as unthrottled as possible an air stream which may flow from the cylinder space into the compression chamber.

A further object of the invention consists in that the compression chamber is so designed as to render it possible to place one or more valves near the cylinder in as favorable a vertical arrangement as possible, the whirling movement which occurs in the compression chamber assuming at the same time an advantageous form.

Another object of the invention is to obtain an engine featuring a smooth and simple running, a good degree of filling charge, a good combustion of fuel air mixture and a high efficiency in engine performance. The invention, moreover, aims at an increase of the compression ratio in order to obtain a high output and a further improvement of the efficiency of the engine.

Hence, one of the chief features of the invention consists particularly in that the upper terminal wall of the cylinder space, which runs upward in a steady oblique direction relatively to the axis of the cylinder toward the side compression chamber, will join the upper terminal wall thereof substantially tangentially; and the piston, which is shaped in conformity with the upper terminal wall of the cylinder, will come close to the latter when reaching the top dead center. This arrangement will chiefly result in that the whirling produced in the compression chamber near the top dead center of the piston by the fluid squeezed and forced out of the interstice between the piston head and the upper terminal wall of the cylinder will take place in the same direction as that of the whirling produced by the overflowing of the air out of the cylinder into the compression chamber during the compression stroke. The first mentioned "squeezed whirl" will virtually not interfere with the latter mentioned "compression whirl," it rather will further and intensify same.

Figure 2:
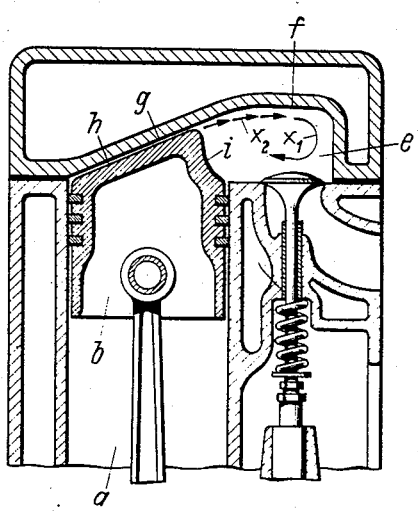
Figure 3:
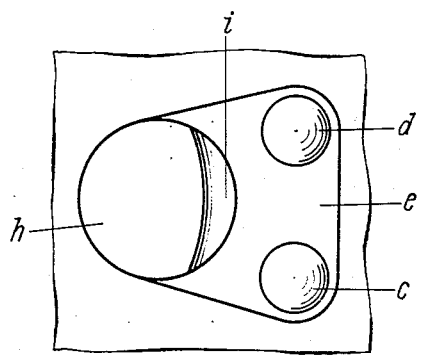

An example of embodiment of the invention is diagrammatically illustrated in the drawing:

Fig. 1 shows a longitudinal cut through the cylinder and one of the valves at one point of the beginning of the compression stroke, Fig. 2 shows a corresponding longitudinal cut through the same engine parts when the piston has reached the top dead center, and Fig. 3 is a ground plan of the engine according to Figs. 1 and 2.

Piston $b$ glides in cylinder $a$. Inlet valve and outlet valve, $c$ and $d$, respectively, are controlled from below, and open into compression chamber $e$ acting as a valve chamber. The compression chamber is arranged in the cylinder head and projects sideward like a pouch out of the circumferential surface of the cylinder also providing for the space necessary for the valves.

According to the invention, upper wall $f$ of the compression chamber joins the upper inclined terminal wall $g$ of the cylinder tangentially, and without forming a cavity. The piston is provided with head $h$ which is obliquely shaped in conformity with the above mentioned terminal wall in such a way that it will come close to the terminal wall $g$ when reaching the top dead center (Fig. 2). Thereby, the air enclosed between $h$ and $g$ will be almost completely forced into the compression chamber or valve chamber $e$. On the side of the piston facing the compression chamber, there is a cavity $i$ the walls of which proceed, as viewed in ground plan, following a straight or curved line. This cavity provides for as favorable a shape of whirl as possible in the compression chamber when the piston reaches the top dead center.

During the major part of the compression stroke, the compressed air, or the compressed mixture, will flow in the direction of the arrow from the cylinder into compression chamber $e$, where it will produce the whirl $x_1$ as shown in Fig. 1. This movement of the fluid will continue till the end of the compression stroke, and be furthered and intensified, in proximity of the top dead center of the piston without any alteration of the direction of whirling by the strong "squeezed whirl" $x_2$, produced as shown in Fig. 2, by the fluid forced out of the narrow interstice between piston head $h$ and cylinder terminal wall $g$ tangentially to the compression chamber $e$. The air or mixture will flow between the cylinder space and the compression chamber without any detour and accommodate itself to the pre-existing flow to the greatest possible extent, so that whirling or eddying will be permitted to assume a particularly efficient formation for more complete combustion. At the same time, a large opened overflow passage between the two chambers will be obtained, thus permitting a virtually unthrottled and full overflowing of the air or mixture from the valve chamber into the cylinder space, and ensuring a high degree of filling of the engine. As a result, it will be possible to choose a relatively high compression ratio.

This invention applies to the carburetor-type or injection-type of engines, or else to any other engine types, and will serve for any purpose, for instance also for high speed vehicle engines; spark plugs, the injection nozzle, or the like, can be arranged in any suitable place of the compression chamber, e. g. in upper terminal wall $f$ or in the side wall at the rear of the valves, or else at the passage section between cylinder and compression chamber.

The invention is not limited to the example of embodiment described in the foregoing, it rather can be varied at will within the scope of the ideas inherent in this invention.

What I claim is:

1. In an internal combustion engine, a cylinder having a reciprocable piston therein, a cylinder head provided with a compression chamber, said cylinder and said cylinder head forming a substantially straight separating joint therebetween, said compression chamber being substantially formed in said cylinder head and being located to one side of and above said cylinder, said separating joint defining the lower limit of said combustion chamber, the wall of said cylinder head delimiting the cylinder space over the piston slanting upwardly substantially rectilinearly at an angle with respect to the cylinder axis from one side of said cylinder opposite said compression chamber to said lateral compression chamber and joining the upper terminal wall of said compression chamber substantially tangentially by means of a small curved portion in said terminal wall, opposite lateral walls of said compression chamber being spaced from one another a distance at least equal to the diameter of said cylinder over the entire length thereof and joining tangentially said cylinder, said piston having a piston head shaped in conformity with the upwardly sloping terminal wall of the cylinder space so as to slant upwardly substantially parallel thereto from said one side to beyond said cylinder axis, said piston head being formed with a depression therein curved along the side thereof opposite said first-named side and facing said compression chamber, said piston head closely approaching said delimiting wall of said cylinder head with said cylinder in top dead center, whereby the whirl produced by displacement of the compressed air into the compression chamber during the compression stroke of said piston takes place in substantially the same direction as the whirl produced by displacement of the compressed air forced from the slanting interstice formed between said piston head and said delimiting wall of said cylinder head, said piston closing said compression chamber against said cylinder space with the piston in top dead center thereof, whereby the compression chamber is enlarged by said depression curved to enhance the whirling action.

2. In an internal combustion engine the combination according to claim 1, wherein said compression chamber is wider than said cylinder and the outwardly broadening opposite lateral walls thereof join substantially rectilinearly the peripheral walls of said cylinder, and further comprising an inlet and a discharge valve located in the lower limiting wall of said compression chamber and substantially perpendicular to said separating joint.

3. In an internal combustion engine according to claim 1 wherein the bottom of said recess in the top dead center position of the piston is substantially flush with the lower terminal wall of said chamber.

References Cited in the file of this patent

UNITED STATES PATENTS

| Number | Name | Date |
|---|---|---|
| 887,393 | Haselwander | May 12, 1908 |
| 1,644,702 | Anderson | Oct. 11, 1927 |
| 1,743,276 | Kreis | Jan. 14, 1930 |
| 2,036,253 | Bremser | Apr. 7, 1936 |

FOREIGN PATENTS

| Number | Country | Date |
|---|---|---|
| 632,907 | France | Jan. 18, 1928 |
| 285,263 | Great Britain | Feb. 16, 1928 |
| 2,164 | Australia | May 19, 1931 |
| 710,619 | France | June 9, 1931 |
| 126,449 | Austria | Jan. 25, 1932 |
| 606,990 | Great Britain | Aug. 24, 1948 |